United States Patent
Dworkin et al.

(10) Patent No.: US 7,852,871 B2
(45) Date of Patent: *Dec. 14, 2010

(54) SYSTEM FOR REAL-TIME CHANGE OF SLOT DURATION WITHIN A WIRELESS NETWORK

(75) Inventors: David Roger Dworkin, Alpharetta, GA (US); Niki Pantelias, Duluth, GA (US); Son Dinh Nguyen, Westminster, CA (US); Yushan Lu, Mission Viejo, CA (US)

(73) Assignee: Broadcom Corporation, Irvine, CA (US)

( * ) Notice: Subject to any disclaimer, the term of this patent is extended or adjusted under 35 U.S.C. 154(b) by 1059 days.

This patent is subject to a terminal disclaimer.

(21) Appl. No.: 11/543,050

(22) Filed: Oct. 5, 2006

(65) Prior Publication Data

US 2007/0140302 A1     Jun. 21, 2007

Related U.S. Application Data

(63) Continuation of application No. 10/207,990, filed on Jul. 31, 2002, now Pat. No. 7,227,871.

(60) Provisional application No. 60/324,951, filed on Sep. 27, 2001.

(51) Int. Cl.
H04B 7/212 (2006.01)
H04J 3/00 (2006.01)
H04N 7/173 (2006.01)

(52) U.S. Cl. ................. 370/442; 370/458; 370/498; 725/116; 725/118

(58) Field of Classification Search ............ 370/442, 370/458, 498; 725/116, 118
See application file for complete search history.

(56) References Cited

U.S. PATENT DOCUMENTS 5,917,813 A    6/1999  Van Driel et al.

(Continued)

FOREIGN PATENT DOCUMENTS

EP            0 903 872 A1     3/1999

(Continued)

OTHER PUBLICATIONS

Eurpean Search Report for European Application No. 02256729.1, Jan. 8, 2010, 3 pages.

*Primary Examiner*—Alpus H Hsu
(74) *Attorney, Agent, or Firm*—Sterne, Kessler, Goldstein & Fox P.L.L.C.

(57) ABSTRACT

A supervisory communications device, such as a base station within a wireless network, monitors and controls communications with a plurality of remote communications devices, such as mobile nodes, throughout a widely distributed network, including the Internet. The supervisory device establishes the upstream slot structure and allocates upstream bandwidth by sending messages over its downstream channel. The supervisory device also uses the messages and minislot counts to anticipate bursts from the remote devices. Dual registers are provided within the supervisory device to generate minislot counts. A primary register generates minislot counts for a current slot structure, and a secondary register generates minislot counts for a revised slot structure. Software executed on the supervisory device determines a switchover time for changing to the revised slot structure and revised minislot count. Prior to switchover, the revised minislot count is passed to the current slot structure processor allowing it to anticipate bursts from the remote devices using the revised slot structure. At switchover, the supervisory device also switches the revised clock along with the revised slot structure, deactivates the primary register, and switches to the secondary register to provide a seamless transition in real time.

5 Claims, 6 Drawing Sheets

U.S. PATENT DOCUMENTS

| | | |
|---|---|---|
| 6,151,329 A | 11/2000 | Berrada et al. |
| 6,243,369 B1 * | 6/2001 | Grimwood et al. ........... 370/335 |
| 6,353,604 B2 * | 3/2002 | Grimwood et al. ........... 370/335 |
| 6,459,703 B1 | 10/2002 | Grimwood et al. |
| 6,490,727 B1 | 12/2002 | Nazarathy et al. |
| 6,742,187 B1 | 5/2004 | Vogel |
| 6,791,995 B1 * | 9/2004 | Azenkot et al. ............. 370/436 |
| 6,961,314 B1 | 11/2005 | Quigley et al. |
| 7,006,535 B2 | 2/2006 | Denney et al. |
| 7,050,419 B2 | 5/2006 | Azenkot et al. |
| 7,086,082 B1 | 8/2006 | Kokkinen |
| 7,113,484 B1 * | 9/2006 | Chapman et al. ............ 370/252 |
| 7,154,846 B2 * | 12/2006 | Chen et al. .................. 370/209 |
| 2002/0101883 A1 | 8/2002 | Ruszczyk et al. |
| 2003/0035442 A1 | 2/2003 | Eng |
| 2003/0061620 A1 | 3/2003 | Denney et al. |

FOREIGN PATENT DOCUMENTS

| | | |
|---|---|---|
| WO | WO 01/43297 A2 | 6/2001 |

* cited by examiner

SYSTEM FOR REAL-TIME CHANGE OF SLOT DURATION WITHIN A WIRELESS NETWORK

CROSS REFERENCE TO RELATED APPLICATIONS

This application is a continuation of and claims the benefit of U.S. patent application Ser. No. 10/207,990, filed Jul. 31, 2002, which claimed the benefit of U.S. Provisional Patent Application Ser. No. 60/324,951, filed Sep. 27, 2001 by Dworkin, et al., entitled "Method and System for Real-Time Change of Slot Duration." Both applications are incorporated herein in their entirety by reference.

BACKGROUND OF THE INVENTION

1. Field of the Invention

The present invention relates generally to communications networking, and more specifically, to modulating bandwidth in a communications network.

2. Background Art

As common in most communications networks, cable television communications networks constantly must be reconfigured to provide adequate bandwidth to a host of users and services. In a conventional cable television communications network, a communications device (such as a modem) requests bandwidth from a headend device prior to transmitting data to its destination. The headend device allocates bandwidth to the communications device based on availability and the competing demands from other communications devices. Typically, bandwidth is available to transmit signals downstream to the communications device. However in the upstream, bandwidth is more limited and must be arbitrated among the competing communications devices. With the advent of personal television services and other non-traditional services (such as, telephony and Internet communications), upstream bandwidth is becoming even more limited.

The downstream channel carries the information used by the communications devices to manage upstream modulation and arbitrate bandwidth requirements. To govern upstream transmissions, the headend device prepares an upstream channel descriptor (UCD) to configure the properties or operating characteristics of the upstream. The UCD provides instructions that, in essence, partition the upstream into multiple regions. In asynchronous networks, the UCD defines one or more upstream channels, and separates each channel into distinct time slots. The communications devices utilize the time slots to transmit various types of upstream bursts.

In addition to specifying a slot within an upstream channel that is used to carry an upstream burst, the UCD also stipulates the slot structure. The slot structure represents the granularity of bandwidth allocation. The slot structure can be defined as a minislot as specified by the Data Over Cable System Interface Specification (DOCSIS) for governing cable communications. A minislot count is used to denote each individual time slot.

After the upstream properties have been configured by an UCD, the headend device generates MAP messages to instruct the communications devices on utilizing the assigned regions. These instructions are dictated in information elements (IE) delineated in a MAP message. In a DOCSIS-compliant system, MAP messages are sent downstream to provide information about time slot assignments for the upstream channels associated with a downstream channel. In other words, the MAP messages assign one or more upstream channels to a specific communications device. The MAP messages also specify a time that may be used by the communications devices to transmit on an upstream channel and the type of data that may be transmitted. Moreover, MAP messages are used by the headend device to predict the arrival of data from a communications device, the source of the data, and the type of data expected.

From time to time, the headend device must modulate the upstream characteristics and/or parameters to increase throughput and/or mitigate noise and corruption in the transmissions from one or more communications devices. One technique used by the headend device is changing or reassigning the upstream channels. For example, if a communications device receives poor service from one upstream channel, the headend device instructs the communications device to use a second upstream channel having different operating characteristics and/or parameters. However, this technique may not be effective if the second upstream channel operates at an equal or worse quality of service. Additionally, switching the communications device to a second upstream channel may adversely impact the services to the communications devices currently operating over the second upstream channel.

A second solution would be to change the operating characteristics and parameters of the existing upstream channel. More specifically, the headend device could generate a new UCD to alter the slot structure. Since the slot structure is being altered, the communications devices must also be commanded to restart the minislot count used to denote each time slots. In other words, once the revised slot structure is implemented, the communications device must restart counting and/or identify the revised minislots with the revised minislot count.

Additionally, the headend device, itself, must also be prepared to implement the revised slot structure and minislot count. The headend device must be able to anticipate the arrival of upstream bursts from the communications devices. Thus, the headend device needs to know the expected size and time-of-arrival of the incoming bursts. MAP messages are used by the headend device to anticipate the arrival of bursts of a specified size. The headend device also generates a minislot count that is paired with the MAP messages. Thus, the headend device uses the minislot count to anticipate the time-of-arrival of the incoming burst.

However, current DOCSIS-compliant systems do not provide an efficient protocol for generating and implementing a new minislot count for a revise slot structure. For example, the headend device typically includes an upstream demodulator interface that receives upstream bursts from the communications devices. The upstream demodulator interface uses the minislot count and MAP messages, produced at the headend device, to plan for the burst's arrival. The upstream demodulator interface also expects each new minislot count to be a sequential increment from the previous minislot count. For instance, if the previous minislot count is "63," the upstream demodulator interface expects the next minislot count to be "64." Moreover, if the upstream demodulator interface receives a new minislot count that is not sequentially related to the previous minislot count, the new minislot count can be rejected.

However, if the headend device changes the slot structure, the headend device also has to re-initiate the minislot count. Since the revised slot structure is either smaller or larger than the current slot structure, the revised minislot count is generated at either a faster or slower rate than the original minislot count. This leads to the distinct possibility that at any given point in time, the actual value of the revised minislot count will differ from the original minislot count. Hence, at the switchover point to the revised minislot count, the actual value of the revised and original minislot counts will differ.

This is problematic because the upstream demodulator interface will receive a different minislot count than expected. Referring to the previous example, at the switchover point, the original minislot count may be at "64," but the revised minislot count may be at, for example, "32" or "128." If the upstream demodulator interface receives a minislot count of "32" after receiving the value "63," the upstream demodulator interface considers the new minislot count to be an error because the value is too old. The upstream demodulator interface may consider the new minislot count to be a delayed value that is no longer valid. Similarly, if the upstream demodulator interface receives a minislot count of "128" after receiving the value "63," the upstream demodulator interface can consider this value to be faulty because it is too far in advance.

As can be seen, if the upstream demodulator interface discards perfectly valid minislot counts or expends a considerable amount of time validating the data, the resulting effect is a degradation in network efficiency and performance. Upstream bursts can be loss or delayed which is intolerable for high quality services such as telephony.

Therefore, a protocol for modulating upstream properties is needed to address the above problems.

BRIEF SUMMARY OF THE INVENTION

The present invention provides a system for the real time change of time slot durations (e.g., minislot) and minislot count in a wireless system. A supervisory communications device, such as a wireless base station, monitors and controls communications with a plurality of remote communications devices, such as wireless mobile nodes including for example, wireless handsets or laptops, throughout a widely distributed network, including the Internet. The supervisory device establishes the upstream slot structure and allocates upstream bandwidth by sending messages to the remote devices. The supervisory device also uses the messages and minislot counts to anticipate bursts from the remote devices.

The supervisory devices include dual registers for generating minislot counts. A primary register generates minislot counts for a current slot structure, and a secondary register generates minislot counts for a revised slot structure.

A software application executes on the supervisory device, and alters the slot duration to accommodate changing network conditions. The slot size is optimally set to carry sufficient payloads to sustain quality of service. The software application determines a switchover time for changing to the revised slot structure and revised minislot count. At switchover, the supervisory device deactivates the primary register and switches to the secondary register to provide a seamless transition in real time.

Accordingly, the present invention includes methodologies and techniques that permit an efficient and seamless changeover to a revised minislot count, and the communication of the same to the appropriate components.

BRIEF DESCRIPTION OF THE DRAWINGS/FIGURES

The accompanying drawings, which are incorporated herein and form part of the specification, illustrate the present invention and, together with the description, further serve to explain the principles of the invention and to enable a person skilled in the pertinent art to make and use the invention. In the drawings, like reference numbers indicate identical or functionally similar elements. Additionally, the leftmost digit(s) of a reference number identifies the drawing in which the reference number first appears.

DETAILED DESCRIPTION OF THE INVENTION

I. Introduction

The present invention includes a method and system for the real time change of time slot durations (e.g., minislot) and minislot count in an asynchronous system. A supervisory communications device, such as the headend device within a cable communications network, monitors and controls communications with a plurality of remote communications devices, such as cable modems. The supervisory device establishes the upstream slot structure and allocates upstream bandwidth by sending UCD and MAP messages to the remote devices. The supervisory device also uses the MAP messages and minislot counts to anticipate bursts from the remote devices.

From time to time, the supervisory device modulates the upstream properties in response to dynamic network conditions. For example, the slot structure is altered to increase throughput or quality of service. As the slot structure is changed, the minislot count is also adjusted for the revised slot structure. The present invention provides protocols for adjusting the minislot in real time to enable the supervisory device to anticipate upstream bursts in the revised slot structures.

II. System Overview

Figure 1:
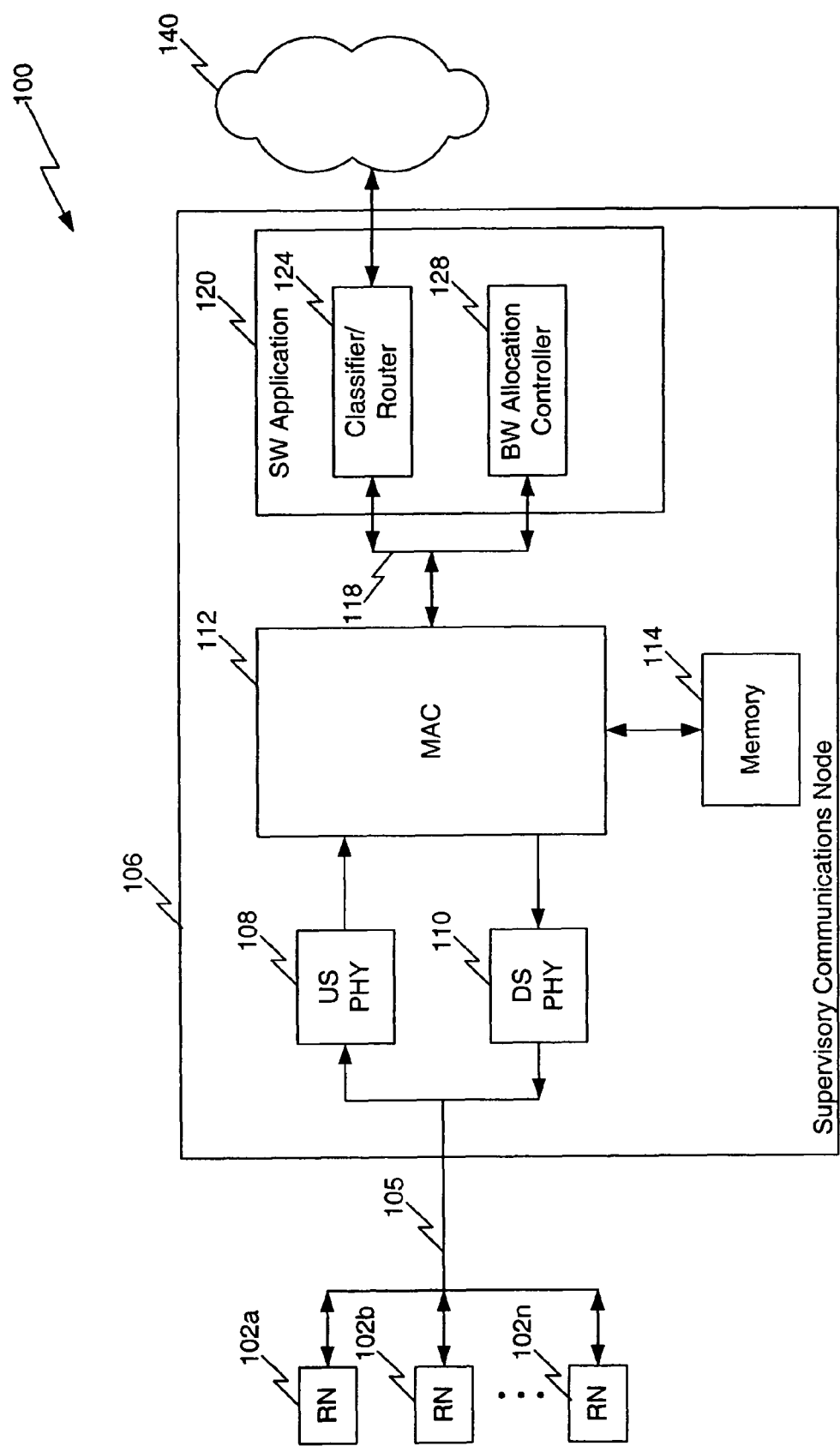
FIG. 1 illustrates a voice and data communications management system according to an embodiment of the present invention.

FIG. 1 illustrates a voice and data communications management system 100 according to an embodiment of the present invention. System 100 includes a supervisory communications node 106 and one or more widely distributed remote communications nodes 102a-102n (collectively referred to as "remote communications nodes 102"). System 100 can be implemented in any multimedia distribution network. Furthermore, it should be understood that the method and system of the present invention manage the exchange of voice, data, video, audio, messaging, graphics, other forms of media and/or multimedia, or any combination thereof.

Supervisory communications node 106 is centrally positioned to command and control interactions with and among remote communications nodes 102. In an embodiment, supervisory communications node 106 is a component of a headend controller for a cable communications network. As such, supervisory communication node 106 is a cable modem termination system (CMTS) or a part thereof. In an embodiment, at least one remote communications node 102 is a cable modem or a part thereof. In another embodiment, supervisory communications node 106 is a CMTS and at least one remote communications node 102 is a component of a television set-top box.

As part of a cable modem, remote communications node 102 is configurable to host one or more services to a subscriber. The services include telephony, television broadcasts, pay-for-view, Internet communications (e.g., WWW), radio broadcasts, facsimile, file data transfer, electronic mailing services (email), messaging, video conferencing, live or time-delayed media feeds (such as, speeches, debates, presentations, infomercials, news reports, sporting events, concerts, etc.), or the like.

Each remote communications node 102 is assigned one or more service identifier (SID) codes that supervisory communications node 106 uses to allocate bandwidth. A SID is used primarily to identify a specific flow from a remote communications node 102. However, as apparent to one skilled in the relevant art(s), other identifiers can be assigned to distinguish between the remote communications node 102 and/or the flow of traffic therefrom. Accordingly, in an embodiment, a SID or another type of identifier is assigned to identify a specific service affiliated with one or more remote communications nodes 102. In an embodiment, a SID or another type of identifier is assigned to designate a particular service or group of services without regard to the source remote communications node 102. In an embodiment, a SID or another type of identifier is assigned to designate a quality of service (QoS), such as voice or data at decreasing levels of priority, voice lines at different compression algorithms, best effort data, or the like. In an embodiment having multiple SIDs assigned to a single remote communications node, a primary SID or remote node identifier (RNID) is used to identify the remote communications node or a general flow from the remote communications node 102, and a service class identifier (SCID) is used to specify a particular flow, service, or quality of service.

In an embodiment, supervisory communications node 106 and remote communications nodes 102 are integrated to support protocols such as Internet Protocol (IP), Transmission Control Protocol (TCP), User Datagram Protocol (UDP), Real Time Transport Protocol (RTP), Resource Reservation Protocol (RSVP), or the like.

Communications management system 100 also includes an internodal infrastructure 105. As shown in FIG. 1, internodal infrastructure 105 provides interconnectivity among supervisory communications node 106 and remote communications nodes 102. Internodal infrastructure 105 supports wired, wireless, or both transmission media, including satellite, terrestrial (e.g., fiber optic, copper, twisted pair, coaxial, hybrid fiber-coaxial (HFC), or the like), radio, microwave, free-space optics, and/or any other form or method of transmission.

All communications transmitted in the direction from supervisory communications node 106 towards remote communications nodes 102 are referred to as being in the downstream. In an embodiment, the downstream is divided into one or more downstream channels. Each downstream channel is configured to carry various types of information to remote communications nodes 102. Such downstream information includes television signals, data packets (IP datagrams), voice packets, control messages, and/or the like. In an embodiment, the downstream is formatted with a motion picture expert group (MPEG) transmission convergence sublayer. However, the present invention can be configured to support other data formats as would be apparent to one skilled in the relevant art(s). In an embodiment, supervisory communications node 106 implements time division multiplexing (TDM) to transmit continuous point-to-multipoint signals in the downstream.

The upstream represents all communications from remote communications nodes 102 towards supervisory communications node 106. In an embodiment, the upstream is divided into one or more upstream channels. Each upstream channel carries bursts of packets from remote communications nodes 102 to supervisory communications node 106. In the upstream, each frequency channel is broken into multiple assignable slots, and remote communications nodes 102 send a time division multiple access (TDMA) burst signal in an assigned slot.

TDM/TDMA is described herein by way of example. It should be understood that the present invention could be configured to support other transmission modulation standards, including, but not limited to, Synchronous Code Division Multiple Access (S-CDMA) or the like, as would be apparent to one skilled in the relevant art(s). In an embodiment, WDM or DWDM is implemented to support optical communications.

As shown in FIG. 1, an embodiment of supervisory communications node 106 includes an upstream demodulator physical interface (US PHY) 108, a downstream modulator physical interface (DS PHY) 110, a media access controller (MAC) 112, a memory 114 and a software application 120. US PHY 108 forms the physical layer interface between supervisory communications node 106 and the upstream channels of internodal infrastructure 105. Hence, US PHY 108 receives and decompresses all bursts from remote communications nodes 102.

Conversely, DS PHY 110 forms the physical layer interface between supervisory communications node 106 and the downstream channel(s) of internodal infrastructure 105. Hence, voice, data (including television or radio signals) and/or control messages that are destined for one or more remote communications nodes 102 are collected at DS PHY 110 and transmitted to the respective remote communications nodes 102. DS PHY 110 compresses and/or formats the information for downstream transmission.

MAC 112 receives the upstream signals from US PHY 108 or provides the downstream signals to DS PHY 110, as appropriate. MAC 112 operates as the lower sublayer of the data link layer of supervisory communications node 106. As described greater detail below, MAC 112 supports fragmentation, concatenation, and/or error checking for signals transported over the physical layer.

Memory 114 interacts with MAC 112 to store the signals as they are processed by MAC 112. Memory 114 also stores various auxiliary data used to support the processing activities. Such auxiliary data includes security protocols, identifiers, rules, policies, and the like, as described in greater details below.

MAC 112 is connected to software application 120 over bus 118, which is a convention bidirectional bus. Software application 120 operates on one or more processors to receive control messages, voice, and/or data from MAC 112 and implement further processing. As shown, software application 120 includes a classifier/router 124 and a bandwidth (BW) allocation controller 128. BW allocation controller 128 manages upstream and/or downstream modulation and bandwidth allocation. Classifier/router 124 provides rules and policies for classifying and/or prioritizing communications with remote communications nodes 102. Classifier/router 124 also routes signals from remote communications nodes 102 to a destined location over backbone network 140.

Backbone network 140 is part of a wired, wireless, or combination of wired and wireless local area networks (LAN) or wide area networks (WAN), such as an organization's intranet, local internets, the global-based Internet (including the World Wide Web (WWW)), virtual private networks, or the like. As such, supervisory communications node 106 utilizes backbone network 140 to communicate with another device or application external to communications management system 100. The device or application can be a server, web browser, operating system, other types of information processing software (such as, word processing, spreadsheets, financial management, or the like), television or radio transmitter, another remote communications node 102, another supervisory communications node 106, or the like.

III. Media Access Controller

In an embodiment, MAC 112 is an integrated circuit within a CMTS (shown in FIG. 1 as supervisory communications node 106). Accordingly, MAC 112 performs a variety of protocol processes defined by the Data Over Cable System Interface Specification (DOCSIS) for governing cable communications. The DOCSIS protocol processing includes interfacing with US PHY 108 and DS PHY 110, encrypting and decrypting data, storing packet data in queues, and/or DMA functions to exchange data with memory 114. Although the present invention is described in reference to DOCSIS protocol processing, it should be understood that the present invention is intended to be inclusive of other types of communication protocols governing multimedia distribution networks.

Figure 2:
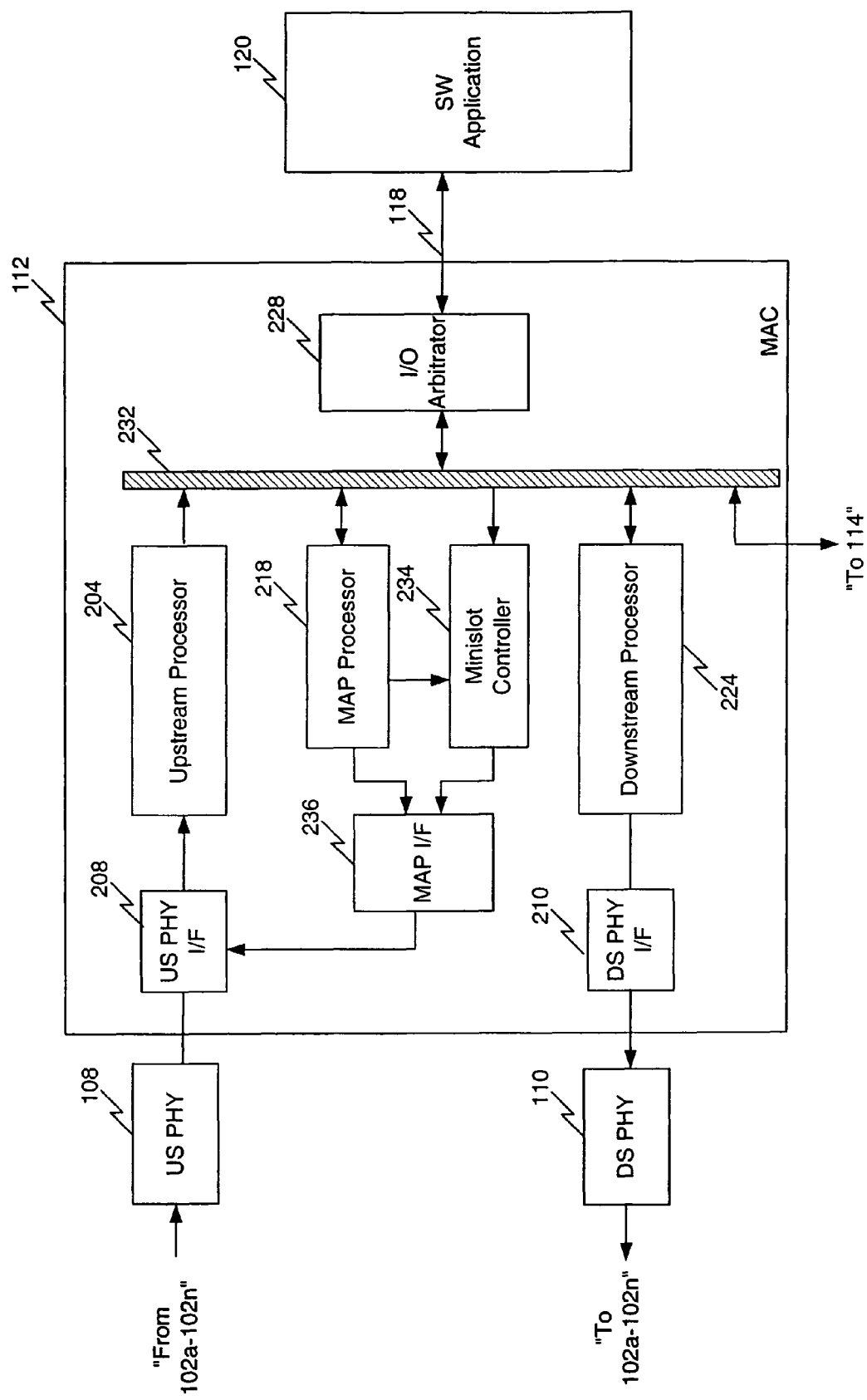
FIG. 2 illustrates a media access controller according to an embodiment of the present invention.

FIG. 2 shows the components of MAC 112 according to an embodiment of the present invention. MAC 112 includes an upstream PHY interface (I/F) 208, downstream PHY interface (I/F) 210, upstream processor 204, MAP processor 218, downstream processor 224, input/output (I/O) arbitrator 228, minislot controller 234, and MAP interface (I/F) 236. The MAC components communicate over bus 232. In an embodiment, the components are connected to bus 232 via universal bus (Ubus) interfaces. As such, bus 232 is an internal-only split transaction bus with built-in arbitration to allow the components to communicate with each other with a shared memory interface to memory 114.

PHY I/F 208 receives signals (including voice, data, bandwidth requests, and/or the like) from US PHY 108 and delivers them to upstream processor 204. Upstream processor 204 processes the signals according to DOCSIS protocols. Upon completion, upstream processor 204 forwards the signals to a queue for further processing. The queues are located in memory 114.

Bus 232 supports the transfer of signals among upstream processor 204, memory 114, and I/O arbitrator 228. I/O arbitrator 228 manages the flow of signals between MAC 112 and software application 120. Particularly, I/O arbitrator 228 interfaces with bus 118 to deliver the signals to software application 120. I/O arbitrator 228 also receives signals from software application 120. Such signals include broadcast signals, control messages, and/or the like to be transported downstream. These signals are typically stored in memory 114 until MAC 112 is ready to process them.

Downstream processor 224 interacts with bus 232 to receive the downstream signals from memory 114. Downstream processor 224 formats and prepares the signals for delivery to PHY I/F 210. If MAP messages are embedded in the signals, MAP processor 218 detects or extracts the MAP messages, or downstream processor 224 forwards them to a MAP queue in memory 114 for subsequent delivery to MAP processor 218. MAP messages can also be detected by I/O arbitrator 228 and delivered directly to MAP processor 218 or a MAP queue located in memory 114.

MAP processor 218 receives and formats the MAP messages to be transmitted to MAP I/F 236. In an embodiment, MAP processor 218 sends the entire MAP message to MAP I/F 236. In another embodiment, MAP processor 218 translates the MAP messages to identify or specify the SID, interval usage code (IUC), length, minislot count, and/or minislot offset for each incoming burst. As such, only this data is sent to MAP I/F 236. As a MAP message is forwarded, MAP processor 218 pulses minislot controller 234. Minislot controller 234 provides a minislot count that is used to designate the upstream slot associated with the MAP message.

MAP I/F 236 receives the MAP message from MAP processor 218 and the minislot count from minislot controller 234. MAP I/F 236 validates the minislot count and postpends the minislot count to the MAP message. MAP I/F 236 forwards the MAP message and minislot count to PHY I/F 208. PHY I/F 208 uses the information to anticipate and demodulate the next upstream burst from remote communications nodes 102a-102n via PHY I/F.

Figure 3:
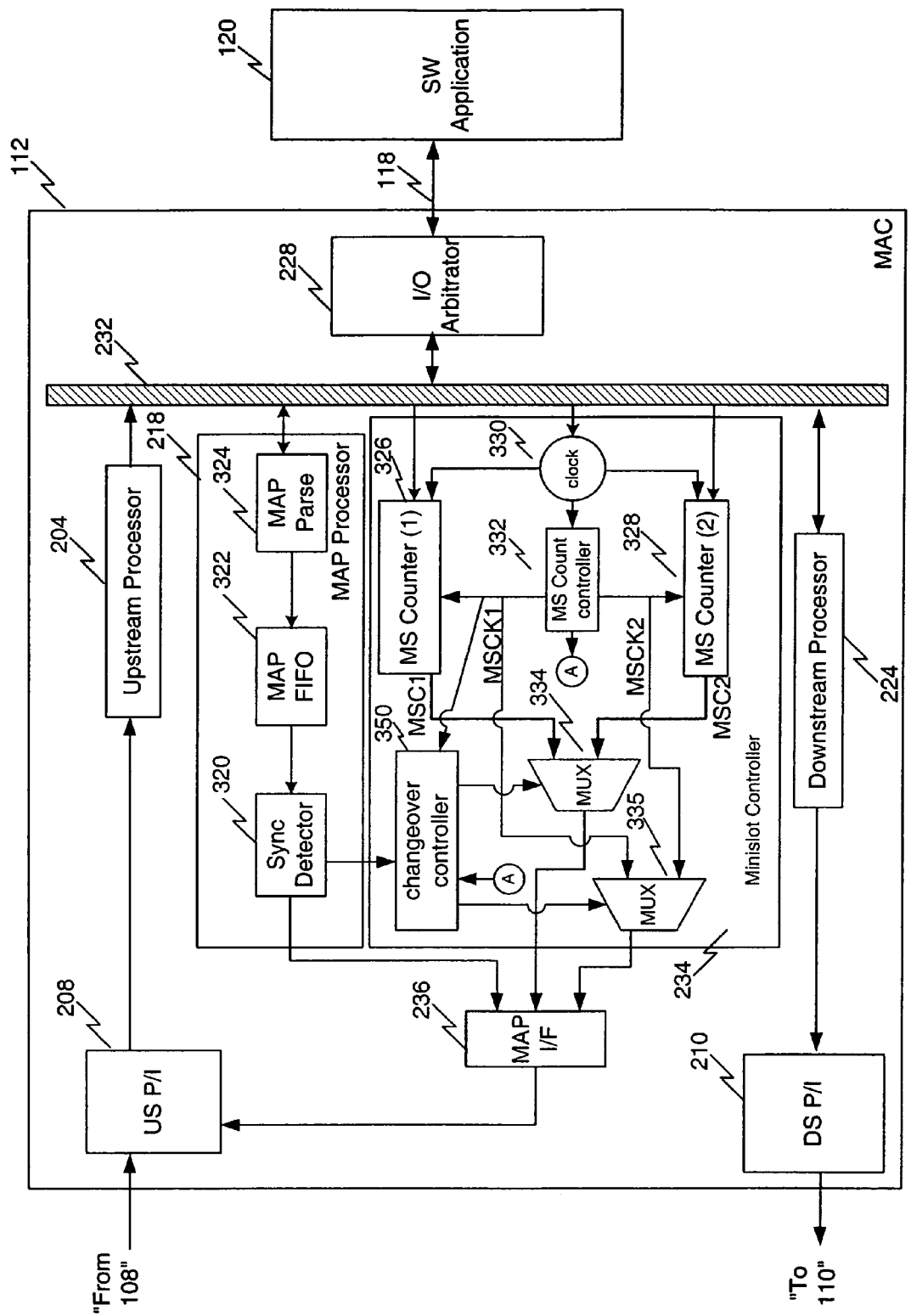
FIG. 3 illustrates a media access controller according to another embodiment of the present invention.

FIG. 3 illustrates another embodiment of MAP processor 218 and minislot controller 234 according to the present invention. MAP processor 218 includes a synch detector 320, a MAP FIFO 322, and a MAP parse 324. MAP parse 324 interfaces with bus 232 to receive MAP messages destined for the downstream remote communications nodes 102. MAP parse 324 serves at least two roles while processing the MAP messages. First, MAP parse 324 ensures that the MAP messages are routed to the destined remote communications node(s) 102. As such, MAP parse 324 forwards the MAP messages to downstream processor 224 with instructions to deliver the MAP messages to the destined remote communications node(s) 102. If downstream processor 224 is unable to receive the MAP messages, the MAP messages are temporarily stored in a MAP queue in memory 114 until downstream processor 224 becomes available.

The second role of MAP parse 324 is to ensure that a duplicate of the MAP messages is provided to PHY I/F 208. As discussed above, PHY I/F 208 uses the MAP messages to anticipate the arrival of upstream bursts. As shown in FIG. 3, MAP parse 324 forwards to MAP FIFO 322 the MAP messages, destined for PHY I/F 208. A separate queue within MAP FIFO 322 is provided for each upstream channel of PHY I/F 208. Thus, the MAP messages are stored in the appropriate MAP FIFO queue within MAP FIFO 322 for the designated upstream channel.

The MAP messages are subsequently delivered to sync detector 320, which forwards the MAP messages to MAP I/F 236. As the MAP messages are processed by sync detector 320, the minislot count (shown in FIG. 3 as MSC1) from minislot controller 234 (i.e., MS counter(1) 326) is passed to MAP I/F 236 along with the associated minislot clock (shown in FIG. 3 as MSCK1). The minislot clock (MSCK1) is equal in frequency to the rate of change of MS counter(1) 326 within minislot controller 234. Sync detector 320 pulses minislot controller 234 for a minislot count change when the beginning of the final MAP associated with a particular parameter set is detected. The parameter set in this embodiment is a minislot count change. In addition to a minislot count change, there is also an associated minislot clock change. In an embodiment, sync detector 320 pulses minislot controller 234 upon receipt of the rising edge of the MAP message signal from MAP FIFO 322 for the purpose of switching from MS counter(1) 326 to MS counter(2) 328.

As shown in FIG. 3, minislot controller 234 includes a clock 330, minislot count (MSC) controller 332, a counter MUX 334, and a clock MUX 335. Minislot controller 234 also includes two registers: MS counter(1) 326 and MS counter(2) 328 (collectively referred to herein as "minislot count (MSC) registers"). Clock 330 is a conventional clock that is initialized and/or periodically updated by software application 120. Clock 330 pulses the MSC registers and MSC controller 332. The signals from MSC controller 332 are used to enable MS counter(1) 326 and MS counter(2) 328 to increment, and are also used for clock signals MSCK1 and MSCK2 because they are the same frequency as the rate of counter change for MS counter(1) 326 and MS counter(2) 328, respectively. In embodiments, software application 120 provides programmed parameters to MSC controller 332 that are implemented to issue a clock enable pulse to the MSC registers. As such, the MSC registers receive clock pulses from clock 330 at all times, but only increment their minislot count values when a clock enable pulse is issued from MSC controller 332.

The MSC registers (i.e., MS counter(1) 326 and MS counter(2) 328), generate the minislot counts used to designate time slots in the upstream region. The MSCK1 and MSCK2 clock signals are used to increment the MSC1 minislot count from MS counter(1) 326 and the MSC2 minislot count from MS counter(2) 328, and the minislot clock signals (i.e., MSCK1 and MSCK2) are output via clock MUX 335 to MAP I/F 236. Software application 120 sends a slot signal to the MSC registers to specify the slot size or slot duration. The slot size is the granularity of bandwidth allocation, and is based on the quantity of ticks per minislot. A tick is 6.25 microseconds (μs) as stipulated by the DOCSIS standards. For illustrative purposes only, the upstream/downstream slot size is herein described in terms of minislots, which represents of smallest unit of data as defined by DOCSIS. However, it should be understood that the present invention could be implemented with other units of slot measurements, including without limitation, bits, bytes, symbols, baud, characters, or like metrics for apportioning bandwidth.

Accordingly, software application 120 specifies the slot size to optimize the upstream for packet transportation. The slot size should not be too large or small, but the slot size should be convenient and easy to handle. In an embodiment, the slot size is set to transport between 16 to 32 bits.

Initially, both MSC registers are loaded with identical slot size parameter. Alternatively, only one of the MSC registers is operable, and the second MSC register is temporarily dormant. As network conditions mature, the present invention allows software application 120 to reset the slot size for optimum upstream performance. As such, software application 120 transmits a slot signal to the dormant MSC register to specify a new slot size. Software application 120 also specifies the new slot size in an UCD that is delivered to the upstream remote communications nodes 102.

Accordingly, the MSC registers receive the slot size (i.e., ticks per minislots) specified by software application 120, and clock pulses from clock 330, and minislot clocks from MSC controller 332. Based on the clock pulses, the MSC registers increment the minislot count according to the specified slot size. The MSC registers initiate its minislot counting after it receives a clock enable pulse from MSC controller 332.

Counter MUX 334 receives a minislot count from one or both MSC registers. Counter MUX 334 also receives a signal from a changeover controller 350. The signal instructs counter MUX 334 to accept or reject minislot counts from one of the two MSC registers. In other words, counter MUX 334 interacts with changeover controller 350 to decide whether to accept minislot count from either MS counter(1) 326 or MS counter(2) 328.

Clock MUX 335 receives the MSCK1 and MSCK2 clock signals from MSC controller 332. Clock MUX 335 also receives a signal from changeover controller 350 which instructs clock MUX 335 to accept or reject minislot clocks from one of the two signals (i.e., the MSCK1 and MSCK2 clock signals).

As such, the present invention provides an efficient protocol for altering the minislot count and minislot clock in a TDMA environment, or the like. Counter MUX 334 forwards the appropriate minislot count to MAP I/F 236 and clock MUX 335 forwards the appropriate minislot clock to MAP I/F 236, as described above in reference to FIG. 2.

IV. Operational Flow for Changing Slot Duration

As described above, supervisory communications node 102 periodically adjusts the slot duration for upstream bursts to optimize network performance. In altering the slot duration, it becomes incumbent upon supervisory communications node 102 to communicate the resulting revised minislot count to various system components in real time. The present invention includes methodologies and techniques that permit an efficient and seamless changeover to a revised minislot count and minislot clock, and the communication of the same to the appropriate components.

Figure 4:
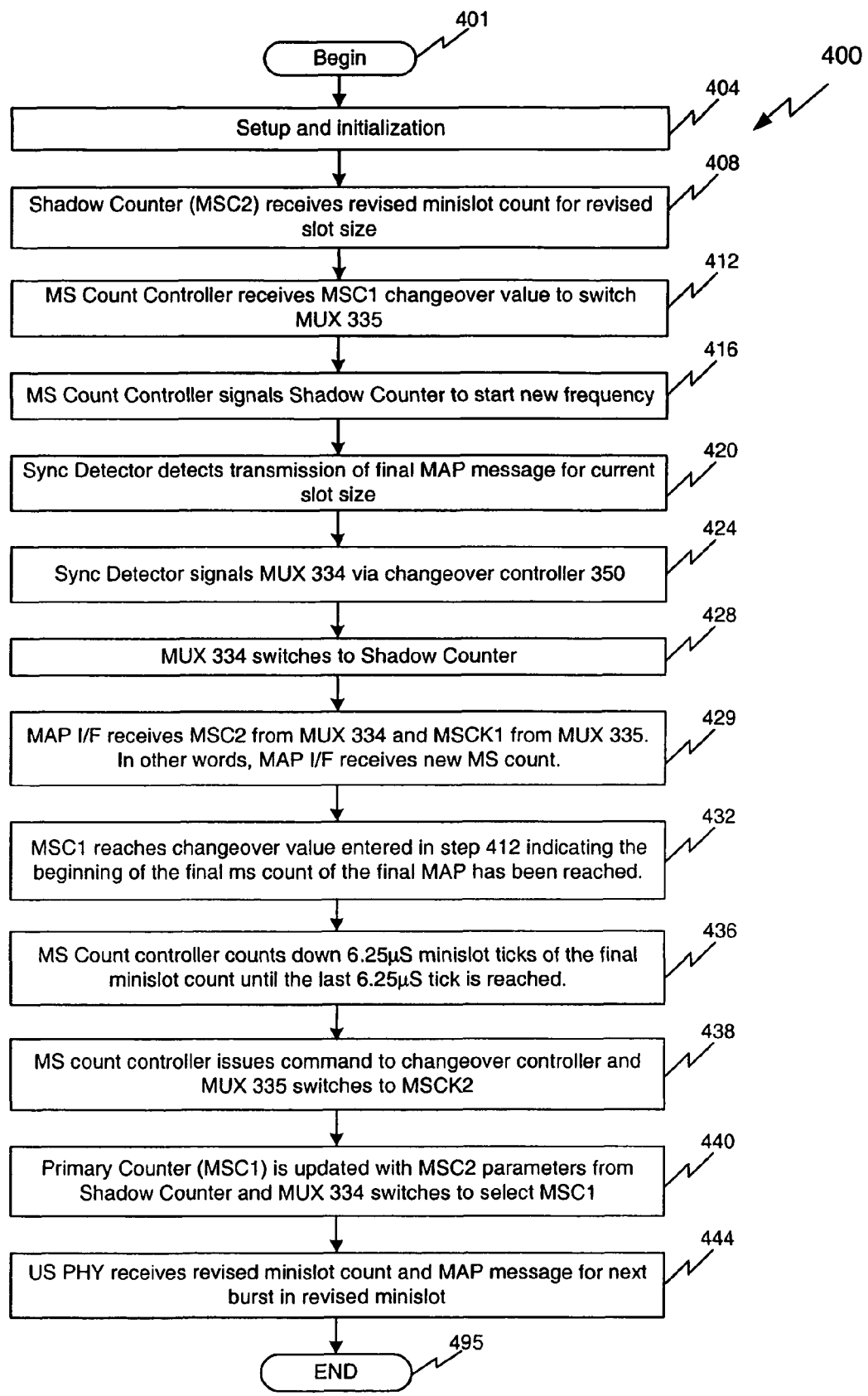
FIG. 4 illustrates an operational flow diagram for changing slot duration according to an embodiment of the present invention.

Referring to FIG. 4, flowchart 400 represents the general operational flow of an embodiment of the present invention. More specifically, flowchart 400 shows an example of a control flow for changing slot durations in an asynchronous communications environment.

The control flow of flowchart 400 begins at step 401 and passes immediately to step 404. At step 404, software application 120 provides the setup and initialization parameters to MAC 112. A first parameter includes instructions to set or synchronize clock 330. In an embodiment, synchronization instructions are also provided to remote communications nodes 102.

A second parameter includes instructions to allocate bandwidth among remote communications nodes 102 and establish the slot size for upstream, asynchronous communication. Software application 120 prepares a UCD to apportion bandwidth and MAP messages to assign bandwidth regions to remote communications nodes 102. The signals containing the UCD and MAP messages are routed to MAP processor 218. MAP processor 218 interacts with downstream processor 224 to deliver the UCD signals and/or MAP signals to the designated remote communications nodes 102. Remote communications nodes 102 processes the signals to send upstream bursts in assigned minislots, as specified by the UCD and MAP signals. MAP processor 218 also delivers MAP signals to MAP I/F 236, which, in turn, sends the MAP signals to PHY I/F 208. PHY I/F 208 uses the MAP signals to plan for the arrival of upstream bursts from remote communications node 102.

A third parameter includes instructions to initiate the generation of a minislot count for labeling and/or identifying upstream minislots. For remote communications node 102, the MAP messages provide the instructions for generating the minislot counts and minislot clocks. As for MAC 112, the MSC registers (i.e., MS counter(1) 326 and MS counter(2) 328)) generate the minislot count and provide this information to PHY I/F 208. In addition to minislot counts, minislot clocks are also provided to PHY I/F 208. The minislot clocks have the same period as the rate of increment for each of the MSC registers. In other words, the rate of change of each minislot clock is the same as the rate of change of each of the MSC registers' least significant bits. Hence, software application 120 sends a slot signal to the MSC registers to specify the initial slot size (i.e., ticks per minislots) for the upstream regions. To generate the minislot count, the MS registers receive clock pulses from clock 330 to increment the minislot count based on the stipulated ticks per minislot. The appropriate minislot clock is also generated according to the stipulated ticks per minislot.

In an embodiment, both MSC registers initially are loaded with an identical slot size parameter. In another embodiment, only one of the MSC registers is operable, and the second MSC register is temporarily dormant. In both embodiments, one MSC register serves as the primary register (hereinafter referred to as MS counter(1) 326), and the second MSC register serves as a shadow register (hereinafter referred to as MS counter(2) 328).

Additionally, software application 120 sends a setup parameter to MSC controller 332. The setup parameter is the count value at which to execute the switchover of the minislot clocking from an old count to a new count. At a time prior to this changeover value, but after the final (old count) MAP begins its exit from the MAP FIFO 322, sync detector 320 issues a pulse to changeover controller 350. The purpose of this pulse is to switch counter MUX 334 from MS counter(1) 326 to MS counter(2) 328.

Figure 5:
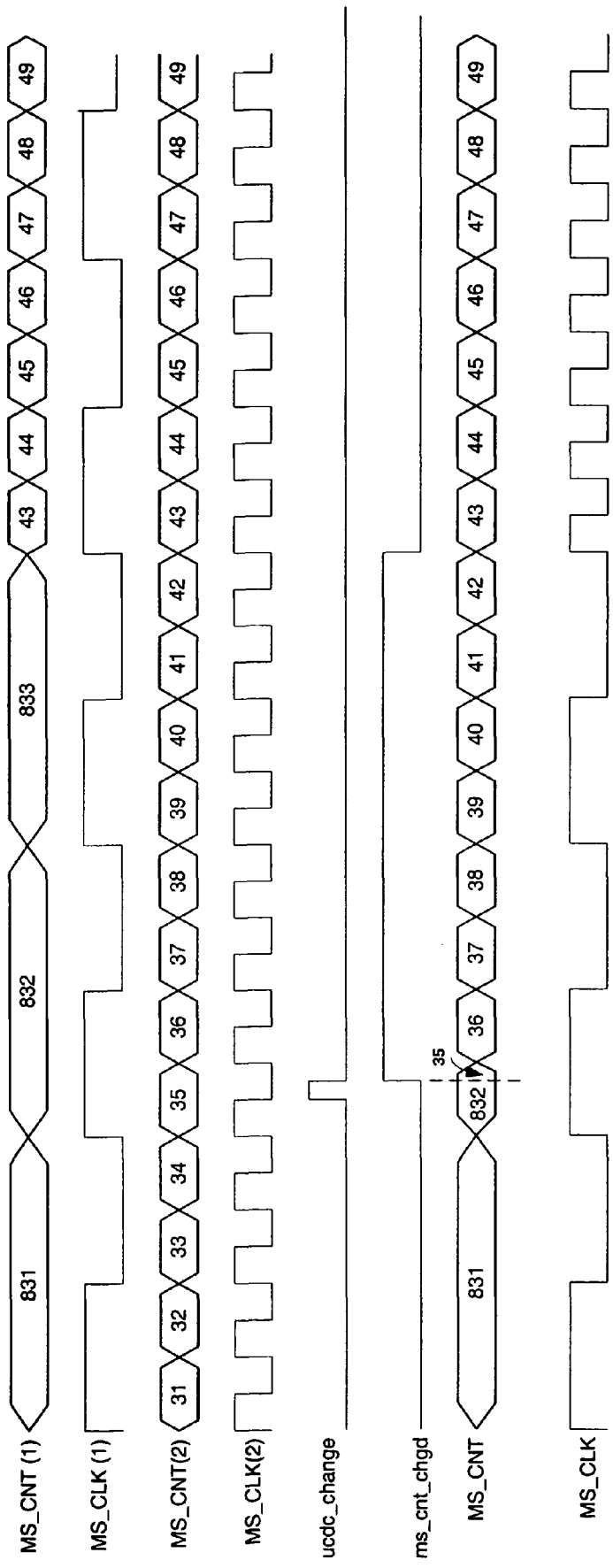
FIG. 5 illustrates a timing diagram for changing minislot clock and minislot count according to an embodiment of the present invention.
Figure 6:
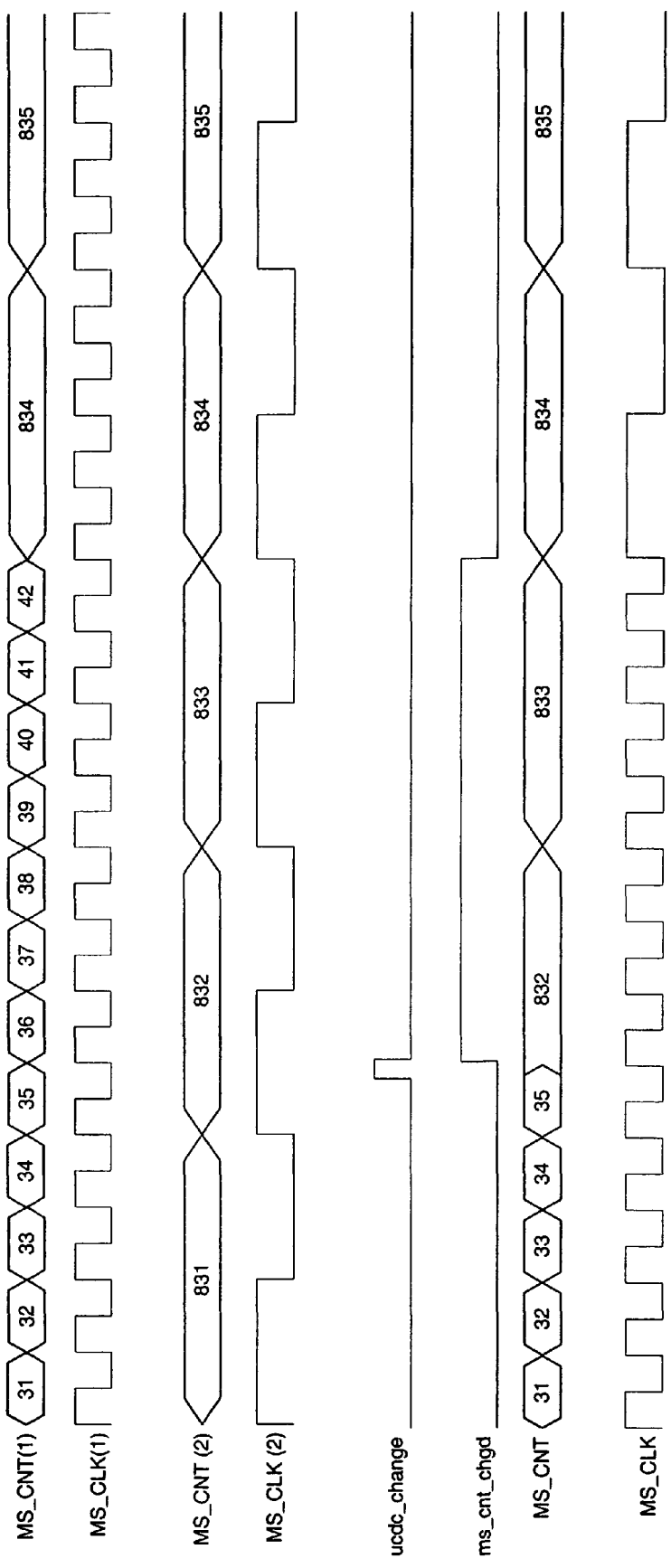
FIG. 6 illustrates a timing diagram for changing minislot clock and minislot count according to another embodiment of the present invention.

FIG. 5 illustrates one such transaction for changing from a lower rate to a higher rate minislot clock and minislot count. FIG. 6 illustrates a similar transaction for changing from a higher rate to a lower rate minislot clock and minislot count. In FIG. 5 and FIG. 6, the first two lines show the MSC1 minislot count (shown as MS_CNT(1)) produced by MS controller(1) 326, and the MSCK1 minislot clock (shown as MS_CLK(1)) associated with MS controller(1) 326. The next two lines show the MSC2 minislot count (shown as MS_CNT (2)) produced by MS controller (2) 328, and the MSCK2 minislot clock (shown as MS_CLK (2)) associated with MS controller(2) 328.

The "ucdc_change" line denotes when sync detector 320 sends the "ucdc_change" signal to changeover controller 350. The "ucdc_change" signal represents the signal to changeover controller 350 which initiates counter MUX 334 to switch from the minislot count (MSC1) signal from MS counter(1) 326 to the minislot count (MSC2) signal from MS counter(2) 328. The "ms_cnt_chgd" line denotes when changeover controller 350 sends the "ms_cnt_chgd" signal to counter MUX 334. The signal "ms_cnt_chgd" is the name of the control signal emitted from changeover controller 350 to counter MUX 334. Finally, "MS_CNT" denotes the minislot counts forwarded to MAP I/F 236, and "MS_CLK" denotes the minislot clock forwarded to MAP I/F 236. As discussed below, the control flow of flowchart 400 is explained with reference back to FIG. 5 and/or FIG. 6.

Referring back to FIG. 4, after the setup and initialization parameters have been implemented, the control flow passes to step 408. At step 408, software application 120 decides to alter the slot size, which, in turn, alters the minislot count. Software application 120 sends a slot signal to shadow MS counter(2) 328 to specify the new slot size. Software application 120 also specifies the new slot size in an UCD that is delivered to remote communications nodes 102.

At step 412, MSC controller 332 receives a changeover signal from software application 120. The changeover signal contains a changeover value. The changeover value is compared to the minislot count MSC1 produced at MS counter(1) 326. When the minislot count reaches the changeover value, the new minislot clock frequency will take effect on MAP I/F 236.

At step 416, shadow MS counter(2) 328 operates at the new desired rate. At step 420, sync detector 320 detects the rising edge of the last MAP message associated with the current minislot count. The MAP signals stored in MAP FIFO 332 include a slot bit that enables MAP FIFO 322 to determine when the slot size has changed. As long as the slot bit in an incoming MAP signal is identical to the slot bit in the preceding MAP signal, MAP FIFO 322 presumes the slot size is unchanged. However, if the slot bit in an incoming MAP signal is different from the slot bit of the preceding MAP signal, MAP FIFO 322 presumes that the slot size has been changed. Accordingly, MAP FIFO 322 flags the preceding MAP message as the last MAP message for the current minislot count. When the last MAP message is sent to sync detector 320, MAP FIFO 322 also signals sync detector 320 that the MAP message is the last MAP message.

At step 424, sync detector 320 signals counter MUX 334 via changeover controller 350 as sync detector 320 detects the rising edge of the last MAP message. As a result, at step 428, counter MUX 334 switches to shadow MS counter(2) 328 and, at step 429, the new (future) minislot counts of MSC2 from MS counter(2) are passed to MAP I/F 236. At this point, the minislot clock passed to MAP I/F is still MSCK1.

An exemplary implementation of steps 424-429 is shown with reference again to FIG. 5. When the beginning of the last MAP is detected by sync detector 320, the "ucdc_change signal" (shown in FIG. 5) is sent to changeover controller 350, and changeover controller 350 causes counter MUX 334 to switch from the MSC1 count signal (shown in FIG. 5 as the "MS_CNT(1)" value of "832") to the MSC2 count signal (shown as the "MS_CNT(2)" value of "35"). At this point, the minislot count (shown by "MS_CNT") received by MAP I/F 236 is the MSC2 count signal (shown as the "MS_CNT" value of "35"). However, the minislot clock (shown by "MS_CLK") received by MAP I/F 236 is still the original minislot clock of MSCK1 (shown by "MS_CLK(1)").

Referring back to FIG. 4, at step 432 the changeover value entered in step 412 is reached. This indicates that the beginning of the final minislot count (i.e., MSC1) of the final MAP has been reached. This initiates step 436 at which MSC controller 332 begins the countdown of 6.25 µs ticks which span the entire length of said final minislot. As discussed above, MSC controller 332 is configured according to minislot size and therefore is able to count down 6.25 µs ticks until the actual end of the final minislot is reached.

At the terminal count or conclusion of the final 6.25 µs tick, control passes to step 438 and MSC controller 332 instructs the changeover controller 350 to switch clock MUX 335 to the new MSCK2 frequency.

At step 440, MS controller(1) 326 is updated with the parameters from MS controller(2) 328 (that have already been passed to MAP I/F 236). Afterwards, counter MUX 334 is switched to pass the MSC1 minislot counts, and clock MUX 335 is switched to pass the MSCK1 minislot clock. Since MS counter(1) 326 assumes the value of MS counter(2) 328, system 100 is now ready to engage another changeover request for the future. In an embodiment, counter MUX 334 and clock MUX 335 are switched immediately after the parameters are updated in MS controller(1) 326, as discussed. In another embodiment, counter MUX 334 does not change to select the MSC1 minislot count, and clock MUX 335 does not change to select the MSCK1 minislot clock until a later time. The intent is preserved regardless of the instantaneous switching of counter MUX 334 and clock MUX 335.

At step 444, sync detector 320 receives the next MAP message that is the first MAP message having the revised slot size. After the revised minislot count has been implement by PHY I/F 208, the control flow ends as indicated by step 495. The system is now ready for the next UCD parameter change involving a change to the MSCK and MSC parameters.

V. Conclusion

FIGS. 1-6 are conceptual illustrations that allow an easy explanation of the present invention. That is, the same piece of hardware or module of software can perform one or more of the blocks. It should also be understood that embodiments of the present invention can be implemented in hardware, software, or a combination thereof. In such an embodiment, the various components and steps would be implemented in hardware and/or software to perform the functions of the present invention.

While various embodiments of the present invention have been described above, it should be understood that they have been presented by way of example, and not limitation. It will be apparent to persons skilled in the relevant art(s) that various changes in form and detail can be made therein without departing from the spirit and scope of the invention. Moreover, it should be understood that the method and system of the present invention should not be limited to transmissions between cable modems and headends. The present invention can be implemented in any multi-nodal communications environment governed by a centralized node. The nodes can include communication gateways, switches, routers, Internet access facilities, servers, personal computers, enhanced telephones, personal digital assistants (PDA), televisions, set-top boxes, or the like. Thus, the present invention should not be limited by any of the above-described exemplary embodiments, but should be defined only in accordance with the following claims and their equivalents.

What is claimed is:

1. A system for modulating slot duration in a wireless communication system, comprising:
   a first minislot counter configured to generate a first series of minislot counts corresponding to a first slot structure;
   a second minislot counter configured to generate a second series of minislot counts corresponding to a second slot structure; and
   a multiplexer configured to send one of the first series of minislot counts or the second series of minislot counts to a burst receiver, wherein the burst receiver matches an incoming burst to each minislot count from the one of the first series or the second series.

2. The system of claim 1, further comprising:
   a sync detector configured to send to the multiplexer a switchover signal, the switchover signal instructing the multiplexer to switch between the first series and the second series.

3. The system of claim 1, further comprising:
   an interface for receiving a minislot count from the multiplexer, wherein the interface sends the minislot count to the burst receiver for matching the minislot count to an incoming burst.

4. The system of claim 1, further comprising:
   a minislot count controller configured to enable the incrementing of at least one of the first minislot counter and the second minislot counter.

5. The system of claim 1, further comprising:
   a second multiplexer configured to send sequentially one of a first series of minislot clocks associated with the first series of minislot counts or a second series of minislot clocks associated with the second series of minislot counts to the burst receiver.

* * * * *